(12) United States Patent
Yahagi et al.

(10) Patent No.: US 9,071,047 B2
(45) Date of Patent: Jun. 30, 2015

(54) VOLTAGE REGULATOR

(71) Applicant: Seiko Instruments Inc., Chiba-shi, Chiba (JP)

(72) Inventors: Akihito Yahagi, Chiba (JP); Yotaro Nihei, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 174 days.

(21) Appl. No.: 13/951,006

(22) Filed: Jul. 25, 2013

(65) Prior Publication Data

US 2014/0029141 A1     Jan. 30, 2014

(30) Foreign Application Priority Data

Jul. 26, 2012   (JP) ................................. 2012-166154

(51) Int. Cl.
*H02H 9/02*     (2006.01)
*G05F 1/573*    (2006.01)

(52) U.S. Cl.
CPC ............... *H02H 9/025* (2013.01); *G05F 1/573* (2013.01)

(58) Field of Classification Search
CPC ................................. G05F 1/573; H02H 9/025
USPC ........................................................... 361/18
See application file for complete search history.

(56) References Cited

U.S. PATENT DOCUMENTS

| | | | |
|---|---|---|---|
| 7,157,892 B1* | 1/2007 | Ritter | 323/284 |
| 2006/0103992 A1* | 5/2006 | Kanakubo | 361/18 |
| 2006/0113978 A1* | 6/2006 | Suzuki | 323/282 |
| 2009/0206807 A1* | 8/2009 | Imura et al. | 323/277 |
| 2011/0074370 A1* | 3/2011 | Imura et al. | 323/277 |
| 2012/0169303 A1* | 7/2012 | Chen | 323/265 |

FOREIGN PATENT DOCUMENTS

JP     2003-271251 A     9/2003

* cited by examiner

*Primary Examiner* — Scott Bauer
(74) *Attorney, Agent, or Firm* — Brinks Gilson & Lione

(57) ABSTRACT

Provided is a voltage regulator including an overcurrent protection circuit using a simple circuit. The voltage regulator includes the overcurrent protection circuit including: a first sense transistor having a gate connected to an output terminal of an error amplifier circuit and a drain connected to a sense resistor; a second sense transistor having a gate connected to the output terminal of the error amplifier circuit; and a control transistor having a gate connected to an output terminal of a control circuit, a source connected to a drain of the second sense transistor, and a drain connected to the sense resistor, in which the control transistor is turned on in response to a detection signal output by the control circuit until a reference voltage exceeds a predetermined voltage.

4 Claims, 3 Drawing Sheets

VOLTAGE REGULATOR

RELATED APPLICATIONS

This application claims priority under 35 U.S.C. §119 to Japanese Patent Application No. 2012-166154 filed on Jul. 26, 2012, the entire content of which is hereby incorporated by reference.

BACKGROUND OF THE INVENTION

1. Field of the Invention

The present invention relates to a voltage regulator, and more specifically, to a technology of preventing an inrush current at start-up.

2. Description of the Related Art

FIG. 4 is a circuit diagram of a conventional voltage regulator including a circuit for preventing an inrush current at start-up.

The conventional voltage regulator includes an output transistor M1, an on-off control circuit 11, a counter circuit 12, a constant current source Q1 and a resistor R3, which constitute a reference voltage circuit, an error amplifier circuit A1, a short-circuit current limiting circuit MB, an output current limiting circuit MA, a switch 13, and transistors M2 and M3.

The conventional voltage regulator includes a first output current limiting circuit MA1 having a higher current limit value and a second output current limiting circuit MA2 having a lower current limit value, and prevents the inrush current at start-up by operating the second output current limiting circuit MA2 at start-up and switching to the first output current limiting circuit MA1 after a predetermined period of time (see, for example, Japanese Patent Application Laid-open No. 2003-271251).

However, the conventional voltage regulator illustrated in FIG. 4 requires protection circuits having different current limit values and the counter circuit for setting a period in which the inrush current is limited, and therefore has problems of an increased chip area and increased current consumption.

SUMMARY OF THE INVENTION

The present invention has been made to solve the above-mentioned problems, and therefore, according to an exemplary embodiment of the present invention, a voltage regulator including a circuit for preventing an inrush current is configured as follows.

A voltage regulator according to an exemplary embodiment of the present invention includes an overcurrent protection circuit including: a first sense transistor having a gate connected to an output terminal of an error amplifier circuit and a drain connected to a sense resistor; a second sense transistor having a gate connected to the output terminal of the error amplifier circuit; and a control transistor having a gate connected to an output terminal of a control circuit, a source connected to a drain of the second sense transistor, and a drain connected to the sense resistor, in which the control transistor is turned on in response to a detection signal output by the control circuit until a reference voltage exceeds a predetermined voltage.

According to the voltage regulator including the overcurrent protection circuit of the present invention, a simple circuit is used so that an increase in chip area as well as an increase in current consumption may be suppressed.

Further, a transistor having the same configuration as a transistor that forms a differential pair with the error amplifier circuit is used so that manufacturing variations may be suppressed.

DETAILED DESCRIPTION OF THE PREFERRED EMBODIMENT

Figure 1:
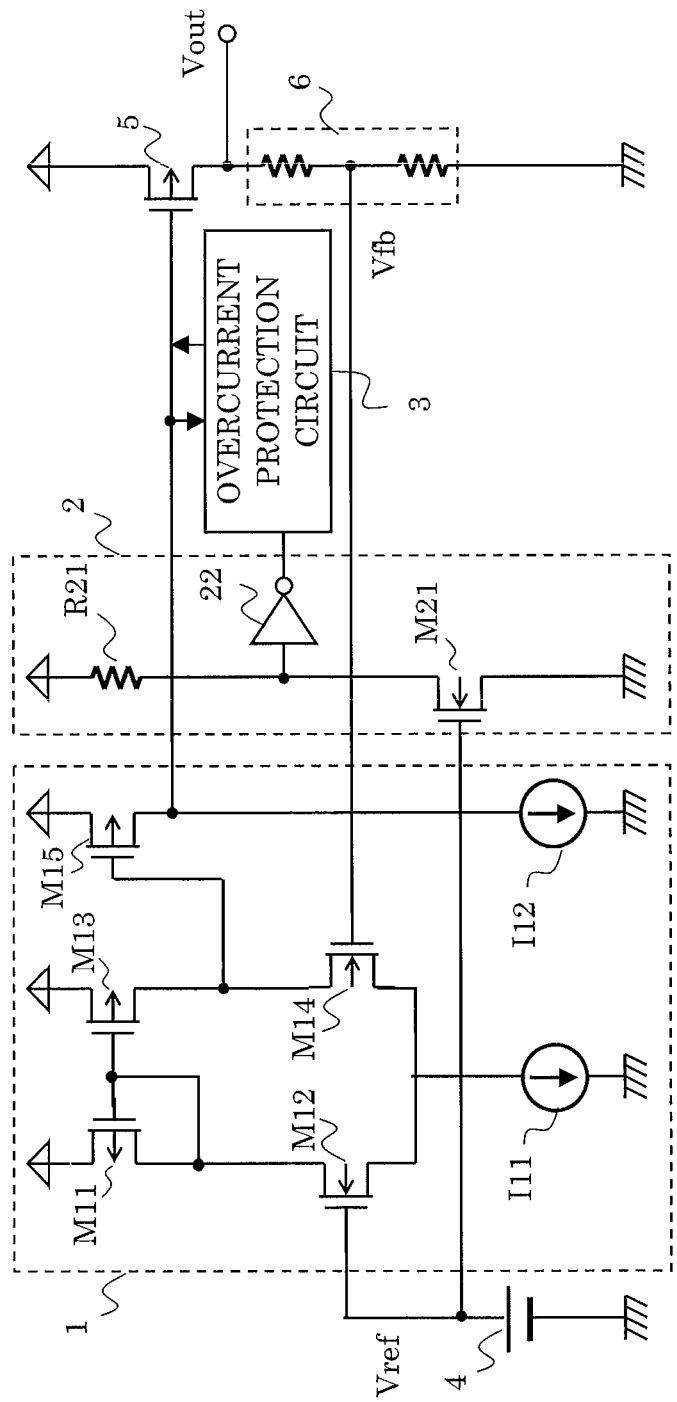
FIG. 1 is a circuit diagram illustrating a voltage regulator according to an embodiment of the present invention.

FIG. 1 is a circuit diagram illustrating a voltage regulator according to an embodiment of the present invention.

The voltage regulator according to the embodiment includes an error amplifier circuit 1, a control circuit 2, an overcurrent protection circuit 3, a reference voltage circuit 4, an output transistor 5, and a voltage dividing resistor 6.

The error amplifier circuit 1 includes, for example, a first-stage error amplifier circuit including transistors M11, M12, M13, and M14 and a constant current source I11, and a second-stage amplifier circuit including a transistor M15 and a constant current source I12. The control circuit 2 includes a resistor R21 and a transistor M21, which are connected in series between a power supply terminal and a ground terminal, and an inverter 22.

The error amplifier circuit 1 has an inverting input terminal connected to an output terminal of the reference voltage circuit 4, and a non-inverting input terminal connected to an output terminal of the voltage dividing resistor 6. The output transistor 5 has a gate connected to an output terminal of the error amplifier circuit 1, a source connected to the power supply terminal, and a drain connected to an output terminal of the voltage regulator. In the control circuit 2, the transistor M21 has a gate connected to the output terminal of the reference voltage circuit 4, and the inverter 22 has an output terminal connected to a second input terminal of the overcurrent protection circuit 3. The inverter 22 has an input terminal connected to a connection node between the resistor R21 and the transistor M21. The overcurrent protection circuit 3 has a first input terminal connected to the output terminal of the error amplifier circuit 1, and an output terminal connected to the gate of the output transistor 5.

Figure 2:
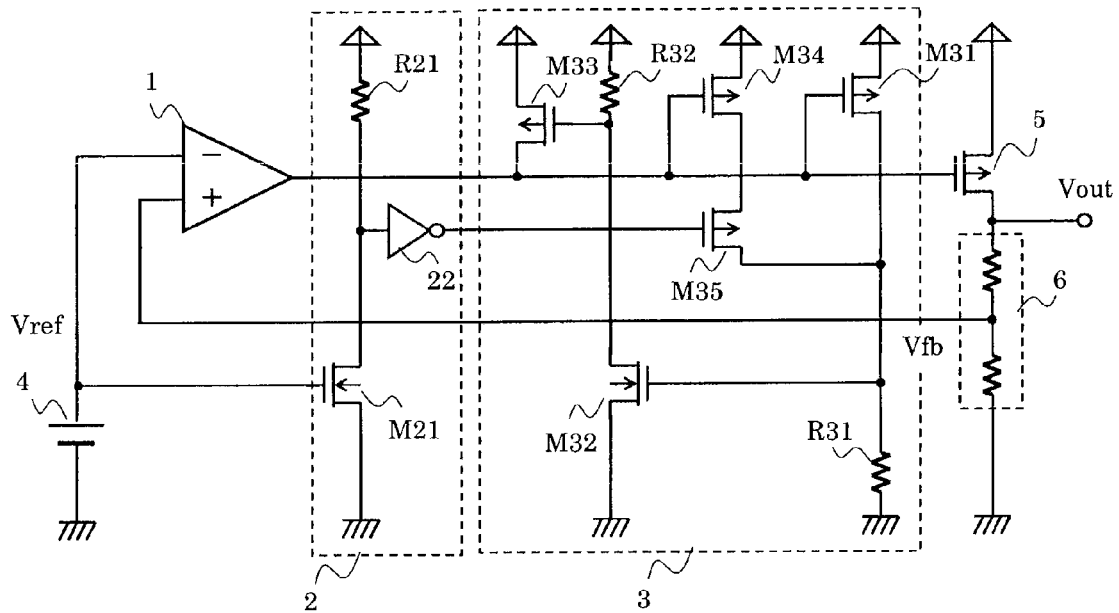
FIG. 2 is a circuit diagram illustrating an example of the voltage regulator according to the embodiment.
Figure 3:
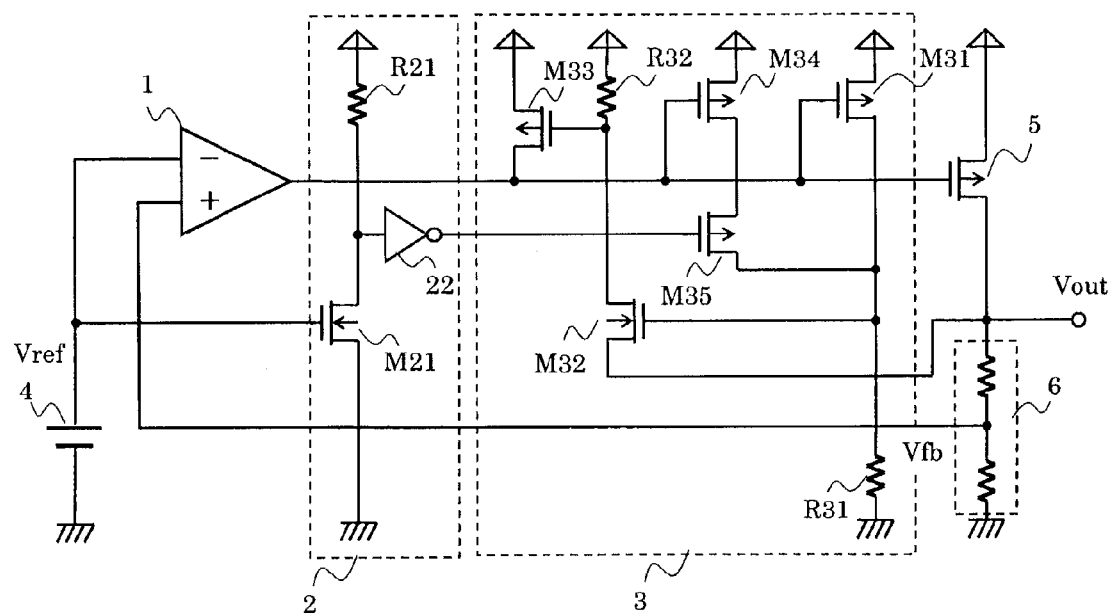
FIG. 3 is a circuit diagram illustrating another example of the voltage regulator according to the embodiment.
Figure 4:
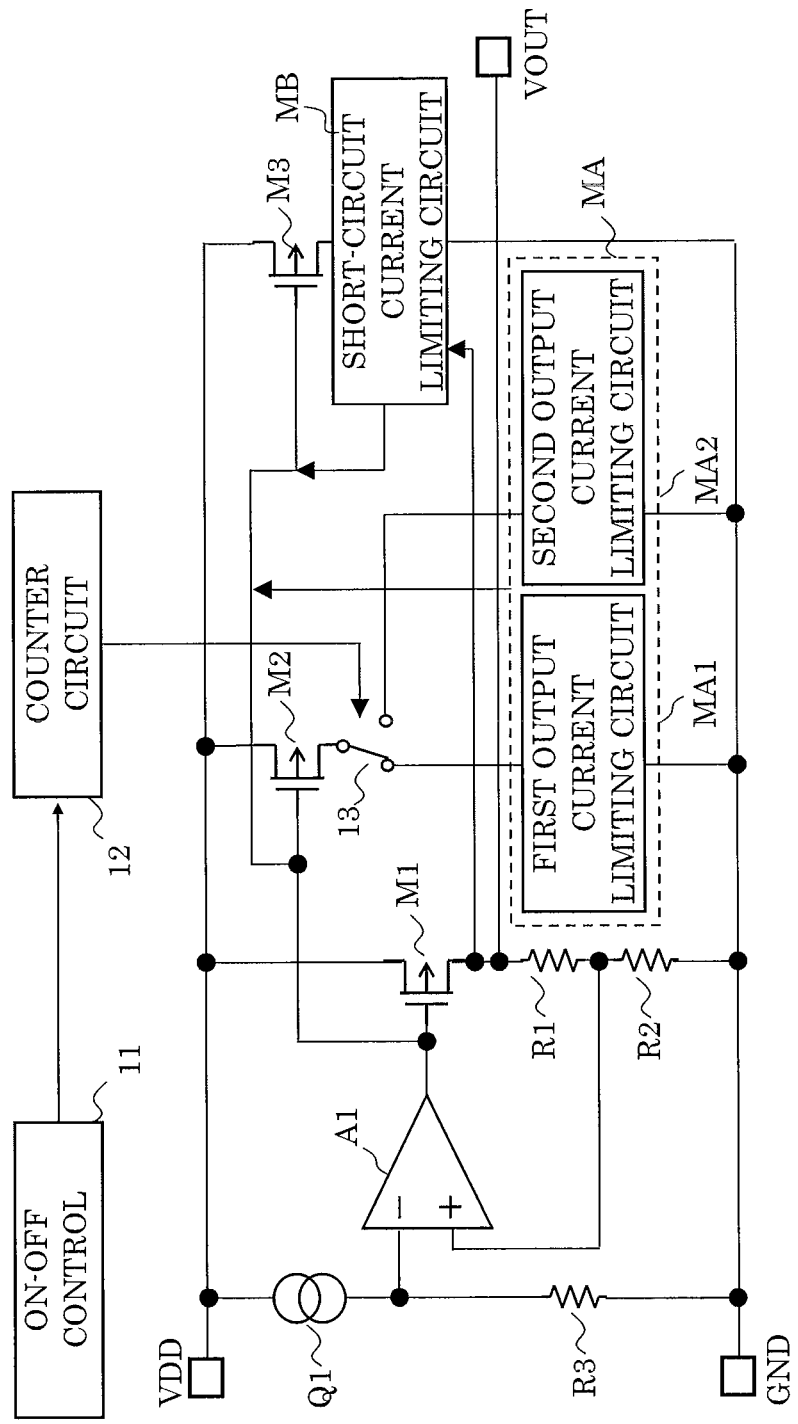
FIG. 4 is a circuit diagram illustrating a conventional voltage regulator.

The overcurrent protection circuit 3 is, for example, a drooping overcurrent protection circuit including a sense transistor M31, a sense resistor R31, a transistor M32, a resistor R32, and a transistor M33 as illustrated in FIG. 2. Alternatively, the overcurrent protection circuit 3 is, for example, a drooping fold-back overcurrent protection circuit including a sense transistor M31, a sense resistor R31, a transistor M32, a resistor R32, and a transistor M33 as illustrated in FIG. 3. In the drooping overcurrent protection circuit 3 of FIG. 2, the transistor M32 has a source connected to the ground terminal. In the drooping fold-back overcurrent protection circuit 3 of FIG. 3, the transistor M32 has a source connected to the output terminal of the voltage regulator.

The overcurrent protection circuit 3 further includes a second sense transistor M34 having a gate connected to the output terminal of the error amplifier circuit 1, and a control transistor M35 having a source connected to a drain of the second sense transistor M34 and a drain connected to the sense resistor R31.

Next, operation of the voltage regulator according to the embodiment is described with reference to the drawings.

The error amplifier circuit 1 inputs a reference voltage Vref output by the reference voltage circuit 4 and a feedback voltage Vfb output by the voltage dividing resistor 6, and amplifies the difference therebetween to output the amplified voltage as a control voltage from the output terminal. The gate of the output transistor 5 is controlled by the control voltage output by the error amplifier circuit 1 so that a voltage of the output terminal of the voltage regulator becomes constant. The overcurrent protection circuit 3 monitors the control voltage output by the error amplifier circuit 1, and when detecting that an overcurrent flows through the output terminal of the voltage regulator, the overcurrent protection circuit 3 performs control so as to raise a gate voltage of the output transistor 5 and reduce an output current.

Now, operation performed when the voltage regulator is powered on is described.

When the voltage regulator is powered on, the output transistor 5 is off, and hence a voltage Vout of the output terminal of the voltage regulator is equal to a ground voltage. In other words, the feedback voltage Vfb is equal to the ground voltage. When the reference voltage Vref exceeds a threshold voltage of the transistor M12, the control voltage output by the error amplifier circuit 1 becomes a low level to turn on the output transistor 5. At this time, the output transistor 5 is rapidly turned on so that an inrush current is generated at the output terminal of the voltage regulator.

In the drooping overcurrent protection circuit 3 illustrated in FIG. 2, the sense transistor M31 is turned on along with the output transistor 5 so that a current flows through the sense resistor R31 and a voltage is generated across the sense resistor R31. A gate voltage of the transistor M32 becomes high to turn on the transistor M32, and hence the transistor M33 is turned on to raise the gate voltage of the output transistor 5 to a high level. In this manner, the voltage regulator reduces the overcurrent at the output terminal.

In this case, a threshold voltage of the transistor M21 of the control circuit 2 is set to be higher than that of the transistor M12 of the error amplifier circuit 1. In other words, in a period from when the reference voltage Vref exceeds the threshold voltage of the transistor M12 to when the reference voltage Vref exceeds the threshold voltage of the transistor M21, an output of the output terminal of the control circuit 2 is at the low level. The control transistor M35 of the overcurrent protection circuit 3 is turned on because a gate thereof is at the low level. In other words, a current from the second sense transistor M34 also flows through the sense resistor R31. Therefore, until the time when the reference voltage Vref exceeds the threshold voltage of the transistor M21, the currents from the two sense transistors M31 and M34 flow through the sense resistor R31, and hence the voltage across the sense resistor R31 becomes high more quickly so that the overcurrent at the output terminal may be reduced more quickly.

Thereafter, when the reference voltage Vref exceeds the threshold voltage of the transistor M21 of the control circuit 2, the output of the control circuit 2 is inverted to turn off the control transistor M35 of the overcurrent protection circuit 3. Therefore, only the current from the transistor M31 is now supplied to the sense resistor R31 to flow therethrough.

As described above, according to the voltage regulator of the embodiment, the current flowing through the sense resistor R31 is increased by an amount that is caused to flow by the second sense transistor M34 during the period in which the inrush current is generated, and hence a threshold voltage of the transistor M32 may be reached with a value smaller than a current limit value of the overcurrent protection circuit in normal operation to limit operation of the output transistor 5.

The drooping fold-back overcurrent protection circuit 3 illustrated in FIG. 3 is also provided with a circuit similar to that of FIG. 2 and performs similar operation so that the operation of the output transistor 5 may be limited during the period in which the inrush current is generated.

Note that, the voltage regulator according to the embodiment has been described taking examples of the combination of the drooping overcurrent protection circuit 3 and the control circuit 2 and the combination of the drooping fold-back overcurrent protection circuit and the control circuit 2, but similar effects may be obtained when a configuration in which both the drooping overcurrent protection circuit and the drooping fold-back overcurrent protection circuit are combined with the control circuit 2 is adopted.

What is claimed is:

1. A voltage regulator, comprising:
   an output transistor for outputting a current depending on a control voltage to an output terminal;
   an error amplifier circuit for comparing a reference voltage output from a reference voltage circuit and a divided voltage obtained by dividing an output voltage of the output terminal by a resistor to output the control voltage to the output transistor;
   an overcurrent protection circuit for outputting a control signal to the output transistor when an output current output by the output transistor reaches a predetermined current limit value; and
   a control circuit for outputting a detection signal to the overcurrent protection circuit until the reference voltage exceeds a predetermined voltage,
   wherein the overcurrent protection circuit comprises:
      a first sense transistor having a gate connected to an output terminal of the error amplifier circuit and a drain connected to a sense resistor;
      a second sense transistor having a gate connected to the output terminal of the error amplifier circuit; and
      a control transistor having a gate connected to an output terminal of the control circuit, a source connected to a drain of the second sense transistor, and a drain connected to the sense resistor, and
   wherein the control transistor is turned on in response to the detection signal output by the control circuit.

2. A voltage regulator according to claim 1,
   wherein the control circuit comprises:
      a transistor having a source connected to a ground and a gate connected to an output terminal of the reference voltage circuit;
      a resistive element having one end connected to a power supply voltage and another end connected to a drain of the transistor; and
      an inverter having an input terminal connected to a connection node between the transistor and the resistive element, and
   wherein the transistor has a threshold voltage that is higher than a threshold voltage of a transistor which forms a differential pair with the error amplifier circuit and is connected to the output terminal of the reference voltage circuit.

3. A voltage regulator according to claim 1, wherein the overcurrent protection circuit comprises a drooping overcurrent protection circuit, a drooping fold-back overcurrent protection circuit, or a drooping overcurrent protection circuit
and a drooping fold-back overcurrent protection circuit.

4. A voltage regulator according to claim 2, wherein the overcurrent protection circuit comprises a drooping overcurrent protection circuit, a drooping fold-back overcurrent protection circuit, or a drooping overcurrent protection circuit and a drooping fold-back overcurrent protection circuit.

* * * * *